US010788602B2

(12) United States Patent
Song et al.

(10) Patent No.: US 10,788,602 B2
(45) Date of Patent: Sep. 29, 2020

(54) METHODS OF SELECTING AN EARTH MODEL FROM A PLURALITY OF EARTH MODELS

(71) Applicant: Halliburton Energy Services, Inc., Houston, TX (US)

(72) Inventors: Rencheng Song, Houston, TX (US); Glenn A. Wilson, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 189 days.

(21) Appl. No.: 15/771,685

(22) PCT Filed: Feb. 16, 2016

(86) PCT No.: PCT/US2016/018009
§ 371 (c)(1),
(2) Date: Apr. 27, 2018

(87) PCT Pub. No.: WO2017/142508
PCT Pub. Date: Aug. 24, 2017

(65) Prior Publication Data
US 2019/0064383 A1    Feb. 28, 2019

(51) Int. Cl.
*G01V 3/38* (2006.01)
*G01V 3/20* (2006.01)
*G01V 3/26* (2006.01)

(52) U.S. Cl.
CPC ............... *G01V 3/38* (2013.01); *G01V 3/20* (2013.01); *G01V 3/26* (2013.01)

(58) Field of Classification Search
CPC ... G01V 3/38; G01V 3/20; G01V 3/26; G01V 3/30; G01V 3/32
(Continued)

(56) References Cited

U.S. PATENT DOCUMENTS 6,594,584 B1    7/2003  Omeragic et al.
8,014,987 B2 *  9/2011  Pabon .................... E21B 44/00
                                                       703/10
(Continued)

FOREIGN PATENT DOCUMENTS

MX    2010004348 A    5/2010
WO    2012144981 A1   10/2012
(Continued)

OTHER PUBLICATIONS

Hauser, J., et al., "Probabilistic inversion of airborne electromagnetic data under spatial constraints," Geophysics, vol. 80, No. 2, Mar.-Apr. 2015, pp. E135-E146.
(Continued)

*Primary Examiner* — John H Le
(74) *Attorney, Agent, or Firm* — Jason Sedano; Parker Justiss, P.C.

(57) ABSTRACT

A logging system includes an electromagnetic logging tool that collects measurements of a subterranean formation as the tool is conveyed along a borehole through the formation. The system further includes a processing system that: generates a first plurality of models of the formation based on at least one first measurement of the formation, the at least one first measurement collected by the tool at a first location of a plurality of locations located along a drilling axis; generates a second plurality of models of the formation based on at least one second measurement of the formation, the at least one second measurement collected by the tool at a second location of the plurality of locations, wherein the second location is adjacent the first location; and selects a model of the first plurality of models based on a spatial continuity of the model with respect to the second plurality of models.

20 Claims, 7 Drawing Sheets

(58) Field of Classification Search
USPC .................................. 702/7, 9, 13; 703/2, 10
See application file for complete search history.

(56) References Cited

U.S. PATENT DOCUMENTS

| | | | |
|---|---|---|---|
| 8,165,817 B2 | 4/2012 | Betancourt et al. | |
| 8,489,375 B2 | 7/2013 | Omeragic et al. | |
| 9,562,988 B2* | 2/2017 | Wilson | |
| 9,784,886 B2* | 10/2017 | Yu | G01V 3/24 |
| 2010/0228485 A1 | 9/2010 | Betancourt et al. | |
| 2011/0106514 A1 | 5/2011 | Omeragic et al. | |
| 2013/0046474 A1 | 2/2013 | Bittar et al. | |
| 2013/0226461 A1 | 8/2013 | Yu et al. | |
| 2015/0088426 A1 | 3/2015 | Tang | |
| 2015/0355373 A1 | 12/2015 | Zhuo et al. | |

FOREIGN PATENT DOCUMENTS

| | | |
|---|---|---|
| WO | 2015005937 A1 | 1/2015 |
| WO | 2015088563 A1 | 6/2015 |
| WO | 2016111678 A1 | 7/2016 |
| WO | 2016111685 A1 | 7/2016 |
| WO | 2017142508 A1 | 8/2017 |

OTHER PUBLICATIONS

Omeragic, D., et al., "3D Reservoir Characterization and Well Placement in Complex Scenarios Using Azimuthal Measurements While Drilling," SPWLA 50th Annual Logging Symposium, Jun. 21-24, 2009, 16 pages.

Zhdanov, M.S., et al., "Exploring multiple 3D inversion scenarios for enhanced interpretation of marine CSEM data: an iterative migration analysis of the Shtokman gas field," First break, vol. 28, Mar. 2010, pp. 95-101, www.firstbreak.org.

Sviridov, M., et al., "New Software for Processing of LWD Extradeep Resistivity and Azimuthal Resistivity Data," SPE Reservoir Evaluation & Engineering, May 2014, pp. 109-127.

Seydoux, J., et al., "Full 3D Deep Directional Resistivity Measurements Optimize Well Placement and Provide Reservoir-Scale Imaging While Drilling," SPWLA 55th Annual Logging Symposium, May 18-22, 2014, 14 pages.

* cited by examiner

METHODS OF SELECTING AN EARTH MODEL FROM A PLURALITY OF EARTH MODELS

CROSS-REFERENCE TO RELATED APPLICATION

This application is the National Stage of, and therefore claims the benefit of, International Application No. PCT/US2016/018009 filed on Feb. 16, 2016, entitled "METHODS OF SELECTING AN EARTH MODEL FROM A PLURALITY OF EARTH MODELS," which was published in English under International Publication Number WO 2017/142508 on Aug. 24, 2017. The above application is commonly assigned with this National Stage application and is incorporated herein by reference in its entirety.

BACKGROUND

In the field of well drilling and logging, resistivity logging tools are used to provide an indication of the electrical resistivity of rock formations surrounding an earth borehole. Such information regarding resistivity is useful in ascertaining the presence or absence of fluids, such as hydrocarbons. A typical electromagnetic propagation resistivity logging tool includes at least one transmitting antenna and multiple receiving antennas located at different distances from the transmitting antenna along the axis of the tool.

The transmitting antenna is used to generate electromagnetic fields in the surrounding formation. In turn, the electromagnetic fields in the formation induce a voltage in each receiving antenna. The response of the formation is converted into a set of inversion parameters, which are then used to estimate the anisotropic properties of the formation.

Inversion can be performed on a point-by-point basis during logging of a borehole. At each of two or more points (or locations) along a length (or stretch) of the borehole, the process described in the above paragraph is performed. A whole-space or "zero-dimensional" or "0D" inversion takes into account the tool measurements at only a single point and ignores formation heterogeneity. To deal with formation heterogeneity, such as shoulder effects from formation layer boundaries, a layered earth or "one-dimensional" or "1D" inversion takes into account the tool measurements from at least a single point to find a layered formation model that matches those measurements. Accordingly, a 1D inversion can be used to determine the locations of boundaries between formation layers.

BRIEF DESCRIPTION OF THE DRAWINGS

There are disclosed in the drawings and the following description methods and systems employing logging measurements for selecting a formation model from two or more formation models. In the drawings.

Figure 1:
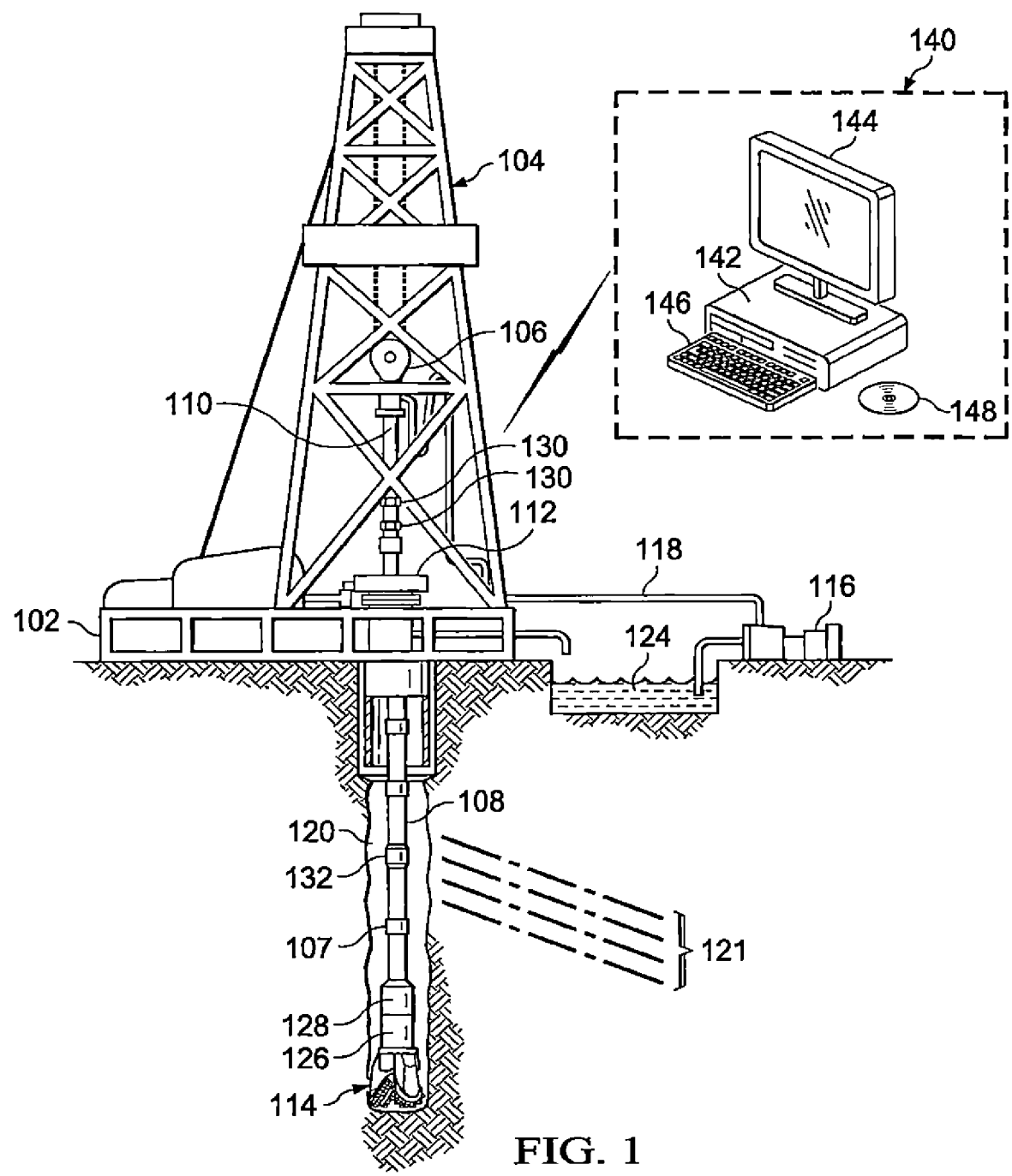
FIG. 1 shows an illustrative logging while drilling (LWD) environment.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for quantitatively interpreting logging-while-drilling (LWD) data (e.g., resistivity LWD data). Particular embodiments relate to selecting a formation model from two or more generated formation models. In at least some embodiments, a method includes generating a first plurality of models of the subterranean formation based on at least one first measurement of the subterranean formation. The at least one first measurement corresponds to a first location of a plurality of locations located along a drilling axis. The method also includes generating a second plurality of models of the subterranean formation based on at least one second measurement of the subterranean formation. The at least one second measurement corresponds to a second location of the plurality of locations. The second location is adjacent to the first location. The method also includes selecting a model of the first plurality of models based on a spatial continuity of the model with respect to the second plurality of models.

A related system includes an electromagnetic logging tool that collects measurements of a subterranean formation as the tool is conveyed along a borehole through the subterranean formation. The logging system further includes a processing system that generates a first plurality of models of the subterranean formation based on at least one first measurement of the subterranean formation. The at least one first measurement is collected by the electromagnetic logging tool at a first location of a plurality of locations located along a drilling axis. The processing system also generates a second plurality of models of the subterranean formation based on at least one second measurement of the subterranean formation. The at least one second measurement is collected by the electromagnetic logging tool at a second location of the plurality of locations. The second location is adjacent to the first location. The processing system selects a model of the first plurality of models based on a spatial continuity of the model with respect to the second plurality of models.

An illustrative LWD environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of the drill string 108 are connected by threaded connectors 107. Connected to the lower end of the drill string 108 is a drill bit 114. Rotation of bit 114 creates a borehole 120 that passes through various formations 121. A pump 116 circulates drilling fluid through a supply pipe 118 to top drive 110, downhole through the interior of drill string 108, through orifices in drill bit 114, back to the surface via the annulus around the drill string, and into a retention pit 124. The drilling fluid transports cuttings from the borehole 120 into the pit 124 and aids in maintaining the integrity of the borehole.

A logging tool 126 is integrated into the bottom-hole assembly near the bit 114. The logging tool 126 may take the form of a drill collar, e.g., a thick-walled tubular that provides weight and rigidity to aid the drilling process. In at least one embodiment, the logging tool 126 is an electromagnetic resistivity LWD tool. For example, the logging tool 126 may be an Azimuthal Deep Resistivity (ADR) service offered by Halliburton Energy Services, Inc., operating in a rotating (drilling) mode. As the bit 114 extends the borehole 120 through the formations 121, the logging tool 126 collects measurements relating to various formation properties as well as the tool orientation and position and various other drilling conditions.

In wells employing mud pulse telemetry for LWD, downhole sensors (including resistivity logging tool 126) are coupled to a telemetry module 128 including a mud pulse telemetry transmitter that transmits telemetry signals in the form of pressure variations in the tubing wall of drill string 108. A mud pulse telemetry receiver array 130 (including, e.g., one or more pressure transducers) may be coupled to tubing below the top drive 110 to receive transmitted telemetry signals. Other telemetry techniques can be employed including acoustic telemetry (using, e.g., one or more repeater modules 132, to receive and retransmit telemetry signals), electromagnetic telemetry, and wired drill pipe telemetry. Many telemetry techniques also offer the ability to transfer commands from the surface to the tool, thereby enabling adjustment of the tool's configuration and operating parameters. In at least some embodiments, the telemetry module 128 additionally, or alternatively, stores measurements for later retrieval when the tool returns to the surface.

A computer system (or processing system) 140 collects measurements from the logging tool 126 (e.g., via the receiver array 130), and includes computing facilities for processing and storing the measurements gathered by the logging tool. In at least some embodiments, the computer system 140 includes a processor 142 that performs formation modeling analysis operations by executing software or instructions obtained from a local or remote non-transitory computer-readable medium 148. The processor 142 may be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In at least some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium. The computer system 140 also may include input device(s) 146 (e.g., a keyboard, mouse, touchpad, etc.) and output device(s) 144 (e.g., a monitor, printer, etc.). Such input device(s) 146 and/or output device(s) 144 provide a user interface that enables an operator to interact with the logging tool 126 and/or software executed by the processor 142. For example, the computer system 140 may enable an operator to select resistivity analysis options, to view collected resistivity data, to view resistivity analysis results, and/or to perform other tasks.

Figure 2:
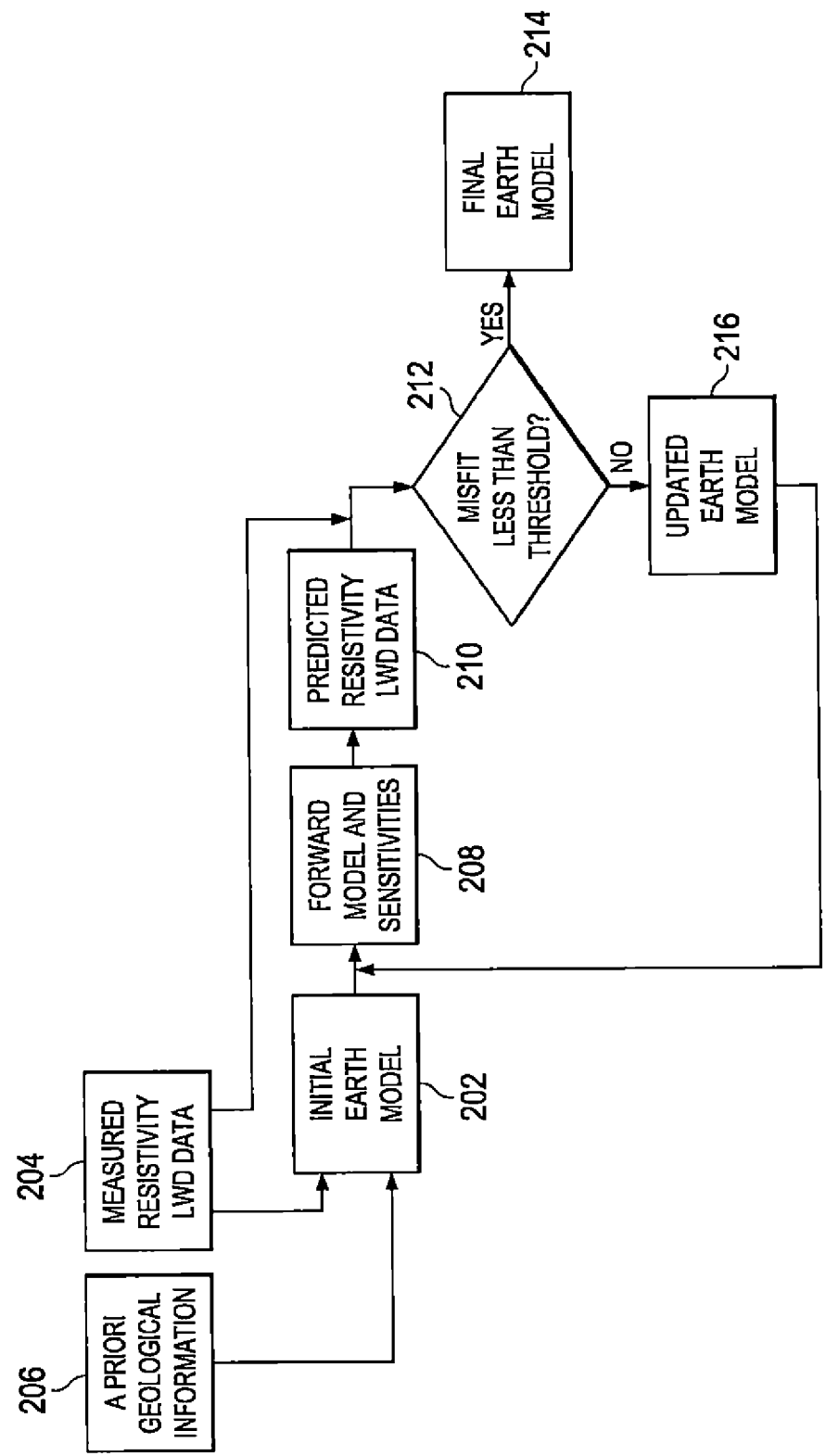
FIG. 2 is a block diagram showing a resistivity inversion according to an embodiment.

FIG. 2 is a block diagram illustrating a resistivity inversion according to an embodiment. The inversion may be a distance-to-bed-boundary (DTBB) inversion for analysis and interpretation. In this situation, a position of a well logging instrument (e.g., logging tool 126) with respect to a bed boundary (e.g., a formation layer discontinuity) is determined by inversion processing.

An initial formation model (or earth model) 202 is used. The initial formation model 202 carries an initial estimate of the geometry and/or properties of the earth formations (e.g., formations 121 of FIG. 1) surrounding a wellbore in which the well logging instrument is positioned. For example, the initial formation model 202 may be characterized by particular layer boundaries and/or particular isotropic or anisotropic values (e.g., resistivity values). Electromagnetic (EM) attributes of the initial formation model 202 may include resistivity, conductivity, permittivity, permeability, chargeability, and/or other induced polarization (IP) parameters. The EM attributes may be isotropic or anisotropic. A layer dip may be recovered from the orientation of the well logging instrument with respect to the 1D resistivity model.

The initial formation model 202 may represent the earth formations surrounding the wellbore as a series of layers or strata, demarcated by boundaries between contiguous layers. In the model 202, physical properties of the individual layers in the model may include, e.g., resistivity (or conductivity) of each layer, a thickness of each layer, and a selected number of layers above and/or below a layer of interest. In at least some situations, the layer of interest is the layer in which the well logging instrument is positioned in the wellbore.

To refine the model 202, measurement data 204 collected by the well logging instrument is input to the model. The measurement data 204 reflects a response of the earth formations to transmissions by the well logging instrument. For example, the measurement data 204 may include measured resistivity LWD data. According to at least some embodiments, other information is input to the model 202. The additional information may include a priori geological information 206, such as surfaces interpreted from seismic analysis (e.g., 3D seismics), well ties, and/or adjacent wells. According to at least some embodiments, the information 206 regards the model 202 as derived from interpretation and/or analysis of prior EM surveys (e.g., marine controlled-source EM surveys, borehole-to-surface EM surveys, cross-well EM surveys). Although the resolution of such information may be lower than the resolution of well logs, such information may still provide useful information regarding general structural trends. In general, the information 206 may be imposed on the model 202 (e.g., in a selective manner) as data weights, model weights, regularization, model constraints and/or a priori models.

Based on the measurement data 204 (and, in at least some embodiments, the a priori information 206), a predicted formation model 208 is generated. The predicted formation model 208 provides a predicted response of the earth formations. The predicted response is converted into a set of inversion parameters, which are then used to estimate (or predict) data 210 of the formations. For example, the estimated data 210 may include resistivity characteristics of the formations.

The resistivity LWD inversion may be based on one or more stochastic optimization algorithms including, e.g., Monte Carlo (MC), Markov Chain Monte Carlo (MCMC), Nearest Neighbor (NN), Genetic Algorithm (GA), or Simulated Annealing (SA) algorithms. Stochastic optimization algorithms extensively search the solution space for global minima and provide statistical information about the earth model parameters. These algorithms are essentially "physics free," in that models are guided on the basis of statistics only, and are not guided by any model sensitivity analysis.

As another example, the resistivity LWD inversion may be based on one or more deterministic optimization algorithms including, but not limited to, Conjugate Gradient (CG), Non-linear Conjugate Gradient (NLCG), and Gauss-Newton (GN) algorithms. Deterministic optimization algorithms are "physics based," in that models are guided by model sensitivity analysis. Deterministic optimization algorithms may also yield statistical information about the earth model parameters. However, such algorithms are dependent upon their initial models, and may converge upon local and not global minima.

With continued reference to FIG. 2, at block 212, the estimated data 210 are compared against the measurement data 204. As described earlier, the measurement data 204 reflect the measured response of the earth formations. A difference(s) between the estimated data 210 and the measured response 204 is referred to as a misfit. At block 212, the difference(s) is compared against a particular threshold(s) (e.g., a preselected threshold(s)). In at least some embodiments, the value of the threshold corresponds to a level of noise that is present in the measurement data 204. If it is determined that the misfit is below the threshold, then the predicted model 208 is used (or adopted) as a final predicted model 214.

However, if it is determined that the misfit is equal to or above the threshold, then one or more parameters of the predicted model 208 are adjusted. For example, a level of the misfit is used to update (or adjust) parameters of the predicted model 208, such that adjustments 216 to the predicted model 208 are generated. The predicted model 208 is updated accordingly. The updated model 208 provides a predicted response of the earth formations. The predicted response is converted into a set of inversion parameters, which are then used to estimate data 210 of the formations. The estimated data 210 is then compared against the measurement data 204. As illustrated in FIG. 2, the described adjustment of block 216 and comparison of block 212 are repeated, until the misfit is below the threshold.

The resistivity inversion illustrated in FIG. 2 may be performed on a "point by point" basis. In more detail, in the wellbore, the well logging instrument may measure data at (or around) two or more locations located in the wellbore (e.g., along a drilling axis). For each of the locations in the wellbore, the resistivity inversion of FIG. 2 is performed using the data measured at the location. Further, for each location, a predicted model (e.g., model 214) providing estimated data that is sufficiently close to the measured data is determined. Accordingly, for a particular number of locations, an equal number of final predicted models 214 are generated. The final models may be 1D resistivity models. These 1D resistivity models may then be stitched together to form a 2D resistivity image of the formation. This 2D image is commonly referred to as a "curtain plot."

According to the block diagram of FIG. 2, a single initial model 202 is considered. More specifically, only a single initial model is used (and perhaps adjusted) for each logging point, resulting in a single predicted model for the logging point. According to a further example, two or more initial models are considered for each logging point. In this situation, two or more resistivity inversions are performed independently of one another. Accordingly, two or more predicted models are generated for each logging point.

Figure 3:
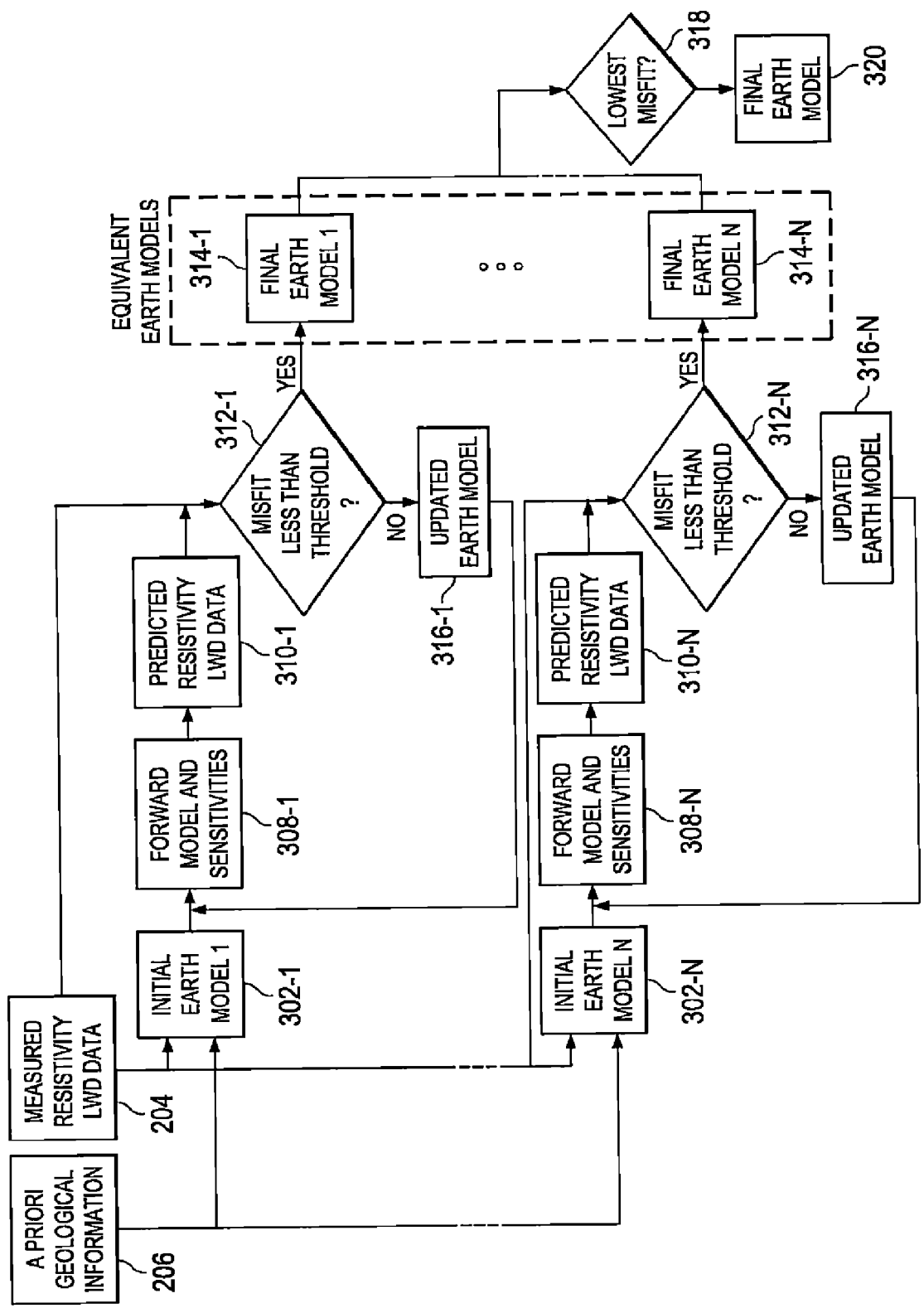
FIG. 3 is a block diagram showing selection of a formation model from among multiple generated formation models.

FIG. 3 is a block diagram showing selection of a formation model from among multiple generated formation models. As illustrated in FIG. 3, two or more initial models 302-1 . . . 302-N are considered. The initial models 302-1 . . . 302-N are different from each other. For example, each of the initial models 302-1 . . . 302-N may reflect a different combination of, e.g., resistivity models, tool placement with respect to layers of the model, and/or predicted model parameters defined from apparent logs or other a priori information. In other aspects, each of the models 302-1 . . . 302-N is similar to model 202 of FIG. 2, and therefore, will not be described in further detail below.

Based on the initial models 302-1, . . . , 302-N, respectively, final predicted models 314-1, . . . , 314-N are generated. For example, just as blocks 208, 210, 212, 216 are performed to generate the final predicted model 214 of FIG. 2, blocks 308-1, 310-1, 312-1, 316-1 are performed to generate a final predicted model 314-1. Similarly, blocks 308-N, 310-N, 312-N, 316-N are performed to generate a final predicted model 314-N. Generation of each of the final predicted models 314-1, . . . , 316-N may include performing a resistivity inversion. The resistivity inversion may be based on a stochastic optimization algorithm and/or a deterministic optimization algorithm.

Each of the final predicted models 314-1, . . . , 316-N is characterized by a corresponding misfit. The final predicted models 314-1, . . . , 316-N are said to be equivalent (or non-unique), in that the respective misfits that characterize the models all fall below a particular threshold (e.g., the threshold corresponding to blocks 312-1, . . . , 312-N). The threshold may correspond to the level of noise that is present in the measurement data 204. The equivalency of the models may be due to, e.g., a lack of sufficient measurement sensitivity, modeling errors, and/or noise in the data.

When analysis of a formation results produces multiple models that are equivalent, one of the models may be selected as being optimal (e.g., better than the remaining models in at least one aspect, such as geological accuracy). In the embodiment of FIG. 3, the particular values of the misfits are utilized to select an optimal model. At block 318, the values of the misfits that characterize the models 314-1, . . . , 316-N are analyzed. The model that has the lowest misfit is selected as the optimal predicted model 320.

Similar to the resistivity inversion illustrated in FIG. 2, the selection illustrated in FIG. 3 may also be performed on a "point by point" basis. Accordingly, for a number of multiple locations, an equal number of optimal predicted models 320 are generated. These 1D resistivity models may then be stitched together to form a 2D resistivity image (or "curtain plot") of the formation.

When the underlying models (e.g., model 320) are chosen strictly based on a degree of misfit, the resulting 2D resistivity images may contain artefacts that are geologically unrealistic. This may occur, e.g., because the selection of block 318 does not consider a degree of spatial continuity of the models (e.g., models 314-1, . . . , 314-N) with respect to at least one different location (or point) in the wellbore. When 2D resistivity images contain such artefacts, the images may have little (or insufficient) resemblance to actual earth models. The appearance of a large number of artefacts erodes confidence in the quality of the modeling results. For example, a large number of artefacts in a well log erodes an interpreter's confidence in the resistivity LWD inversion.

Figure 4:
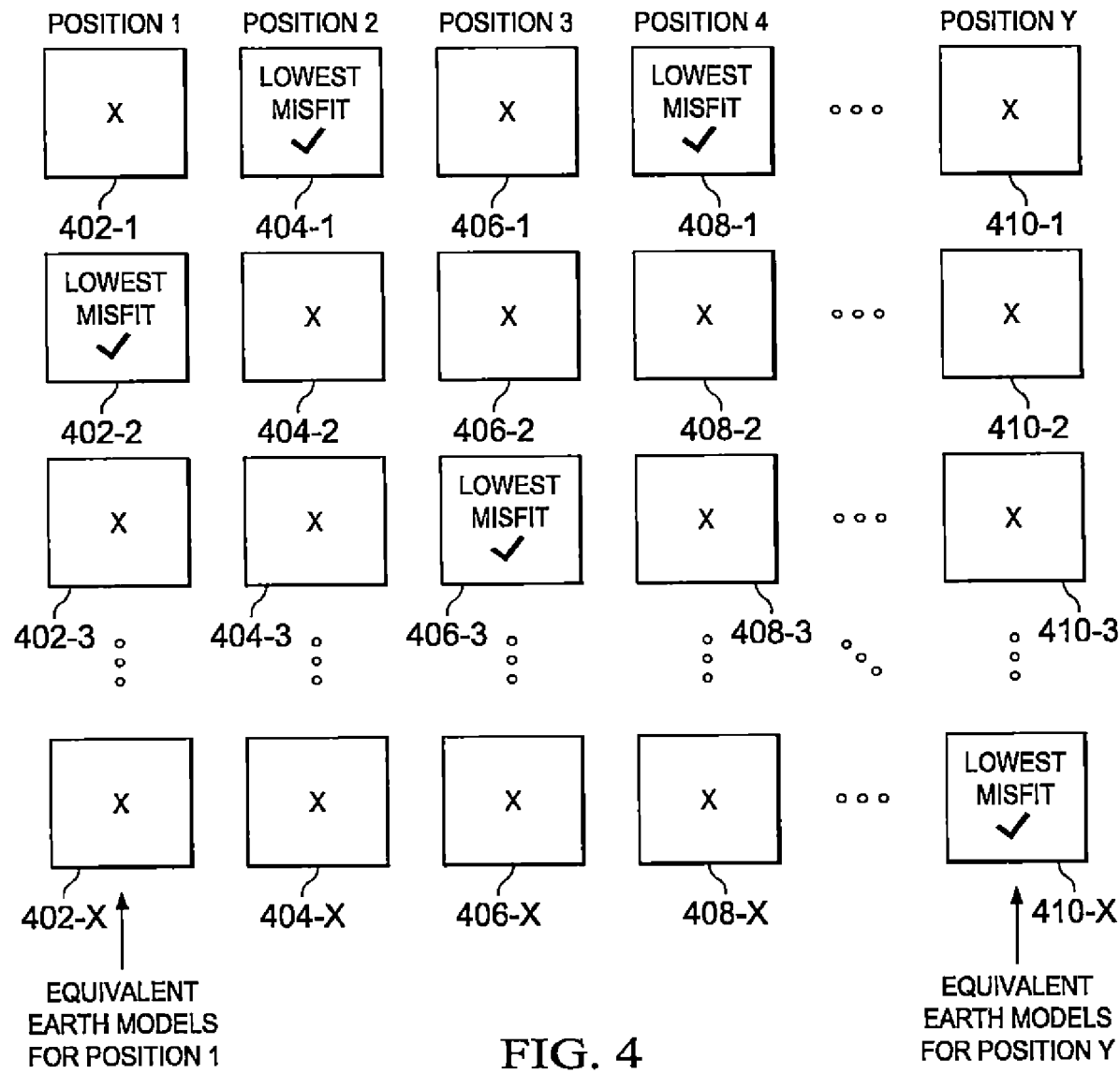
FIG. 4 shows an illustrative scenario in which the selection of FIG. 3 is performed at multiple locations.

FIG. 4 illustrates a scenario in which the selections of FIG. 3 are performed for multiple locations. During LWD operations, a well logging instrument (e.g., logging tool 126) is positioned (e.g., sequentially) at locations (or positions) 1, 2, 3, 4, . . . , Y. For example, the locations 1, 2, 3, 4, . . . , Y may correspond to various locations along a horizontal wellbore. These locations may be equally spaced such that, e.g., the locations 1, 2, 3, 4, . . . , Y correspond to measured depths of 2 meters (m), 4 m, 6 m, 8 m, . . . , (Y*2) meters.

For each of the locations, a number of final predicted models are generated. These final predicted models are similar to the models 314 of FIG. 3. For example, at location 1, final predicted models 402-1, 402-2, 402-3, . . . , 402-X are generated. Similarly, at location 2, final predicted models 404-1, 404-2, 404-3, . . . , 404-X are generated, and, at location 3, final predicted models 406-1, 406-2, 406-3, . . . , 406-X are generated. Similarly, at location 4, final predicted models 408-1, 408-2, 408-4, . . . , 408-X are generated, and, at location Y, final predicted models 410-1, 410-2, 410-3, . . . , 410-X are generated.

For each of the locations, the model characterized by the lowest misfit is selected as the optimal predicted model. This is similar to the situation described earlier with respect to FIG. 3, in which the model 320 is selected from models 314-1, . . . , 314-N. As illustrated in FIG. 4, for locations 1, 2, 3, 4, . . . , Y, the models 402-2, 404-1, 406-3, 408-1, . . . , 410-X are selected, respectively.

For example, for location 2, the model 404-1 is selected from the models 404-1, 404-2, 404-3, . . . , 404-X because the model 404-1 is characterized by a misfit that is lower than the misfits that characterize the remaining models (models 404-2, 404-3, . . . , 404-X). In this situation, the selection of the model 404-1 does not take into consideration a spatial continuity of the models 404-1, 404-2, 404-3, . . . , 404-X with respect to models generated for at least one other location. For example, the model 404-1 is selected without considering any of the models generated for adjacent location 1 (models 402-1, 402-2, 402-3, . . . , 402-X). Also for example, the model 404-1 is selected without considering any of the models generated for adjacent location 3 (models 406-1, 406-2, 406-3, . . . , 406-X).

The above-described nature of the selection of FIG. 3 may increase the likelihood that a resulting 2D resistivity image will contain geologically unrealistic artefacts. For example, with respect to location 2, such a likelihood may be increased, e.g., if unselected model 404-2 bears a high degree of similarity to one or more models generated for location 3 (e.g., model 406-3). In this situation, a degree of spatial smoothness between unselected model 404-2 and model 406-3 is likely stronger than degrees of spatial smoothness between selected model 404-1 and any of models 406-1, 406-2, 406-3, . . . , 406-X. Accordingly, the selection of model 404-2 as an optimal model for location 2 may be preferable over the selection of model 404-1.

In at least some situations, properties of a formation are generally continuous. For example, the lithological interfaces and physical properties of sedimentary formations generally exhibit lateral variations that vary slowly. This may be particularly true in the case of a horizontal well that extends generally parallel to the formation boundaries. Accordingly, for a particular location, selecting an optimal model without considering earth models generated for at least one other location (e.g., an adjacent or nearby location) may lead to an increased number of artefacts in a resulting 2D resistivity image.

As will be described in further detail below, according to various aspects of the disclosure, two or more equivalent earth models are generated (e.g., based on resistivity LWD inversions) for a particular location in a borehole. The generated models are analyzed based on at least one metric in order to select one of the models as an optimal model. According to particular aspects, the metric is based on spatial coherency (e.g., of resistivity LWD data), and the observation that most earth formations are continuous yet smoothly varying (due to, e.g., the notion that the earth is generally continuous along the lateral direction). The metric may include a degree of spatial continuity (e.g., spatial smoothness) of the generated models with respect to models that are generated for at least one other location (e.g., an adjacent or nearby location) in the borehole. Accordingly, from among the equivalent earth models generated for the particular location, one model is selected based at least on a determination that the model has a sufficiently high degree of spatial continuity with respect to at least one model generated for a different location. This increases the likelihood that the selected model is more geologically reasonable (or plausible) than unselected models. Accordingly, the likelihood that the selected model is more geologically accurate than other model(s) (e.g., any or at least one of the unselected models) is improved, relative to selecting a model based on misfit alone (e.g., as described earlier with reference to FIG. 4).

Figure 5:
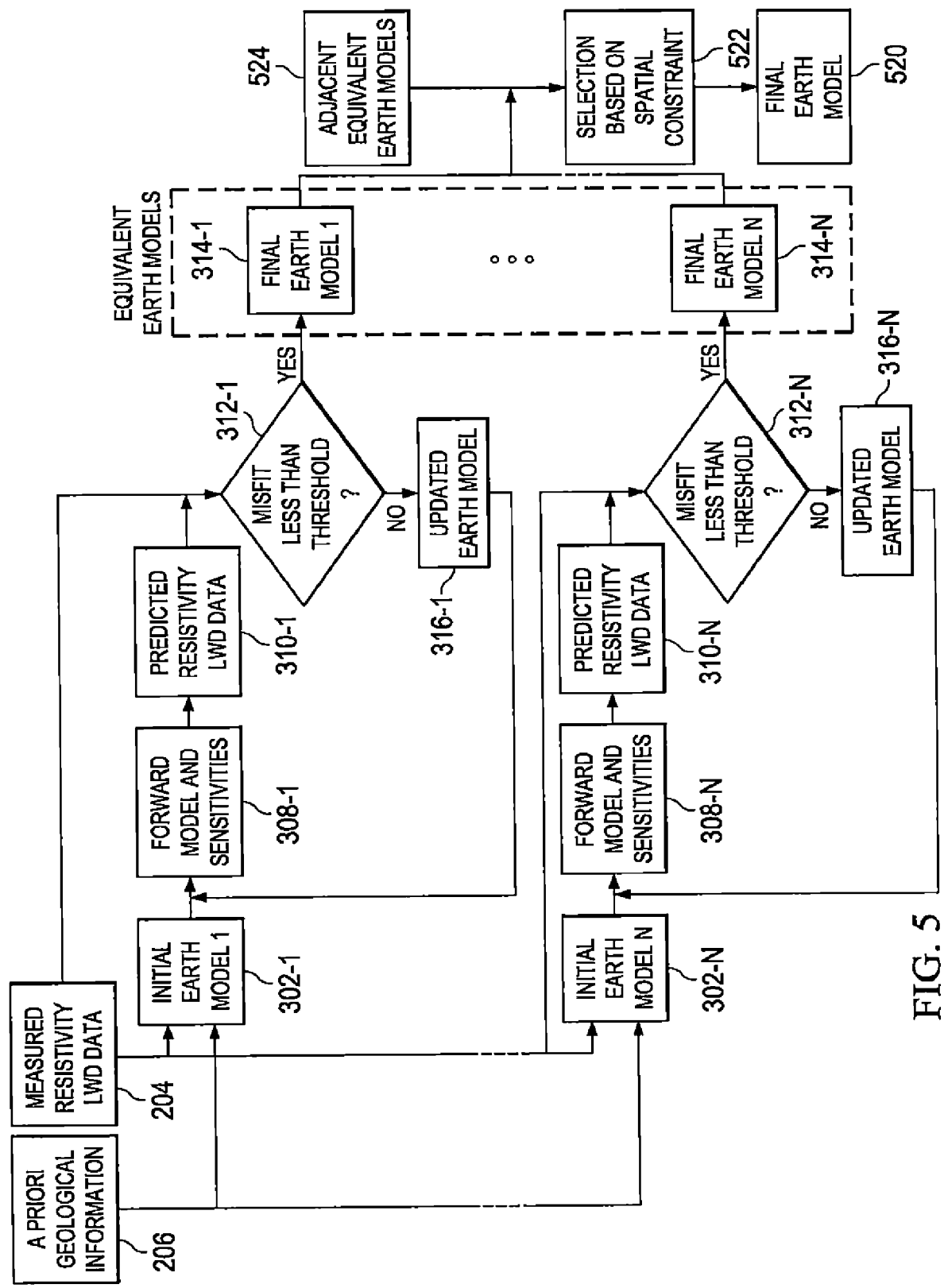
FIG. 5 is a block diagram showing selection of a formation model from among multiple generated formation models according to an embodiment.

FIG. 5 is a block diagram showing selection of a formation model from among multiple generated formation models according to an embodiment. As described earlier with reference to FIG. 3, based on the initial models 302-1, . . . , 302-N, final predicted models 314-1, . . . , 314-N are generated, respectively, for a particular location in a borehole. The final predicted models 314-1, . . . , 314-N are equivalent in that the respective misfits that characterize the models all fall below a particular threshold. At block 522, one of the models 314-1, . . . , 314-N is selected based on, at least, a constraint relating to spatial smoothness. The selection of block 522 uses information 524 regarding one or more models that are generated for an adjacent location. According to particular embodiments, one of the models 314-1, . . . , 314-N is selected as an optimal model 520 based on a degree of spatial continuity of one or more parameters of the model with respect to the one or more models corresponding to information 524. Unlike the comparison of block 318 of FIG. 3, the selection 522 is based not merely on misfits that characterize the models 314-1, . . . , 314-N.

For a particular model (e.g., any of models 314-1, . . . , 314-N), a vector m may denote one or more parameters of the model. For another model (e.g., any model corresponding to information 524), a second vector $m_o$ may denote one or more corresponding parameters of this other model.

According to at least one embodiment, the selection at block 522 involves comparing m and $m_o$ (e.g., computing a difference between m and $m_o$). This comparison may be performed for each of models 314-1, . . . , 314-N. Accordingly, for a given one of the models 314-1, . . . , 314-N, the comparison is performed with respect to one or more models generated for the adjacent location. Therefore, for the models 314-1, . . . , 314-N, at least N comparison results are obtained.

According to a further embodiment, the selection at block 522 involves normalizing the N or more comparison results, based on one of the comparison results. For example, if differences between m and $m_o$ are determined, then the differences may be normalized based on a model that results in a largest difference M. As captured in Expression (1), a minimum normalized difference is identified:

$$\|m-m_o\|_M^2 \rightarrow \min. \quad (1)$$

From among the models 314-1, . . . , 314-N, the model that results in the minimum normalized difference is selected as the optimal model 520.

The vector m may denote EM attributes of the earth models 314-1, . . . , 314-N. As described earlier, these EM attributes may include resistivity, conductivity, permittivity, permeability, chargeability, and/or other induced polarization (IP) parameters. The EM attributes may be either isotropic or anisotropic. According to further embodiments, the vector m may, additionally or alternatively, denote one or more other attributes. For example, these other attributes may include the depth to a layer boundary, the depths to each of a pair of layer boundaries, and/or the dip of the boundaries.

According to at least one embodiment, the vector m may denote a function of one or more attributes (e.g., one or more of the attributes that are noted above). For example, the vector m may denote the thickness of a layer, as derived from the difference between the depths to each of a pair of two boundaries. As a further example, the vector m may denote the resistivity (conductivity) of a layer, as derived from the product of the resistivity and the anisotropy coefficient. Also, the vector m may denote both the thickness and the resistivity, and potentially one or more other attributes.

As described earlier with reference to Expression (1), differences between m and $m_o$ are computed. According to other examples, other formulations may be determined. For example, a normalized difference between a first derivative of m and a first derivative of $m_o$ may be determined. As captured in Expression (2), a minimum normalized difference is identified:

$$\|\nabla m - \nabla m_o\|_M^2 \to \min. \quad (2)$$

From among the models 314-1, ..., 314-N, the model that results in the minimum normalized difference (e.g., in a minimum rate of change of the underlying attribute) is selected as the optimal model 520.

According to another example, a normalized difference between a second derivative (e.g., Laplacian) of m and a second derivative of $m_o$ may be determined. As captured in Expression (3), a minimum normalized difference is identified:

$$\|\nabla^2 m - \nabla^2 m_o\|_M^2 \to \min. \quad (3)$$

From among the models 314-1, ..., 314-N, the model that results in the minimum normalized difference (e.g., in a minimum rate of change of the rate of change of the underlying attribute) is selected as the optimal model 520.

According to another example, a combination (e.g., a linear combination) of formations that are captured in Expressions (1), (2), and/or (3) is considered. For example, a sum of (i) a normalized difference between m and $m_o$, (ii) a normalized difference between a first derivative of m and a first derivative of $m_o$, and (iii) a normalized difference between a second derivative of m and a second derivative of $m_o$ may be determined. As captured in Expression (4), a minimum sum is identified:

$$\|m - m_o\|_M^2 + \beta\|\nabla m - \nabla_o\|_M^2 + \gamma\|\nabla^2 m - \nabla^2 m_o\|_M^2 \to \min. \quad (4)$$

In Expression (4) and other expression(s) presented in this disclosure, β and γ denote non-negative scalar parameters that provide balance (or bias) between the normalized values $\|m-m_o\|_M^2$, $\|\nabla m - \nabla_o\|_M^2$ and $\|\nabla^2 m - \nabla^2 m_o\|_M^2$.

As described earlier with reference to Expressions (1), (2), (3) and (4), a minimum result based on a parameter of a model is identified. According to further embodiments, the minimum result may be further based on an indicator of inversion quality (e.g., misfit, signal-to-noise ratio, importance). For example, the result may be based on a value of a misfit ϕ. As described earlier with reference to blocks 212 and 312 of FIGS. 2 and 3, respectively, a misfit refers to a difference(s) between estimated data (e.g., estimated data 210 of FIG. 2) and a measured response (e.g., measured response 204 of FIG. 2).

For example, a minimum result based on a combination (e.g., linear combination) of the misfit ϕ and formulations that appear in Equations (1), (2), (3) and/or (4) may be identified. For example, a sum of: (i) the misfit ϕ and (ii) a normalized difference between m and $m_o$ may be determined. As captured in Expression (5), a minimum sum is identified:

$$\phi + \alpha \|m - m_o\|_M^2 \to \min. \quad (5)$$

From among the models 314-1, ..., 314-N, the model that results in the minimum result is selected as the optimal model 520.

In Expression (5) and other expression(s) presented in this disclosure, α denotes a scalar quantity that provides a balance (or bias) between the misfit ϕ and the noted formulations. According to particular embodiments, α denotes a noise-to-signal ratio (NSR) for the measured data (e.g., measured data 204 of FIG. 2).

According to another example, a sum of (i) the misfit ϕ and (ii) a normalized difference between a first derivative of m and a first derivative of $m_o$ may be determined. As captured in Expression (6), a minimum sum is identified:

$$\phi + \alpha \|\nabla m - \nabla m_o\|_M^2 \to \min. \quad (6)$$

From among the models 314-1, ..., 314-N, the model that results in the minimum result is selected as the optimal model 520.

According to another example, a sum of (i) the misfit ϕ and (ii) a normalized difference between a second derivative (e.g., Laplacian) of m and a second derivative of $m_o$ may be determined. As captured in Expression (7), a minimum sum is identified:

$$\phi + \alpha \|\nabla^2 m - \nabla^2 m_o\|_M^2 \to \min. \quad (7)$$

From among the models 314-1, ..., 314-N, the model that results in the minimum result is selected as the optimal model 520.

As another example, a sum of (i) the misfit ϕ, (ii) a normalized difference between m and $m_o$, (iii) a normalized difference between a first derivative of m and a first derivative of $m_o$, and (iv) a normalized difference between a second derivative of m and a second derivative of $m_o$ may be determined. As captured in Expression (8), a minimum sum is identified:

$$\phi + \alpha\|m - m_o\|_M^2 + \beta\|\nabla m - \nabla m_o\|_M^2 + \gamma\|\nabla^2 m - \nabla^2 m_o\|_M^2 \to \min. \quad (8)$$

From among the models 314-1, ..., 314-N, the model that results in the minimum result is selected as the optimal model 520.

In Expressions (1) to (8), the spatial formulations effectively serves as filters upon the earth models (e.g., models 314-1, ..., 314-N). These filters may be selected to act upon the earth models based on a scale length that is typical of the geological formation (e.g., 5 to 10 feet) rather than a scale length corresponding to a distance between measurement points (e.g., 0.5 feet).

The parameters of the models in Expressions (1) to (8) may be weighted by a model weighting matrix $W_m$, as captured in Expression (9):

$$\phi + \alpha \|W_m(m - m_o)\|_M^2 \to \min, \quad (9)$$

Elements of the model weighting matrix $W_m$ provide spatial weighting for directionality, e.g., a dip known a priori based on seismic interpretation or borehole imaging.

According to another embodiment, the equivalent earth models (e.g., models 314-1, ..., 314-N) are assembled in a 2D (pixel) resistivity model in coordinates of measured depth (MD) and true vertical depth (TVD), e.g., ρ(MD, TVD), where ρ denotes resistivity, and (MD, TVD) denote coordinates of a trajectory. In this situation, a degree of spatial continuity may be evaluated on the basis of Expression (10) below:

$$\Sigma_{j=1}^{T} \left| \frac{\partial \rho(MD_j, TVD_j)}{\partial MD_j} \right| \to \min. \quad (10)$$

Here $MD_j$ for $j=1, \ldots, T$ denotes the MD point in processed interval where $MD_1$ and $MD_T$ specify the minimal and maximal MD range that the models are supposed to be continuous.

To solve Expression (10), the derivative of the resistivity with respect to measured depth may be approximated with a finite-difference approximation from the 2D resistivity model, as captured in Expression (11) below:

$$\Sigma_{j=1}^{T} \left| \frac{\Delta \rho(MD_j, TVD_j)}{\Delta MD_j} \right| \to \min. \quad (11)$$

Alternatively—to solve Expression (10), the 2D resistivity model may be fit to a spatially continuous 1D function with respect to measured depth (e.g., with a cubic spline) such that the derivatives of the spatially continuous 1D function with respect to measured depth may be analytically evaluated, and summed per Expression (10).

Figure 6:
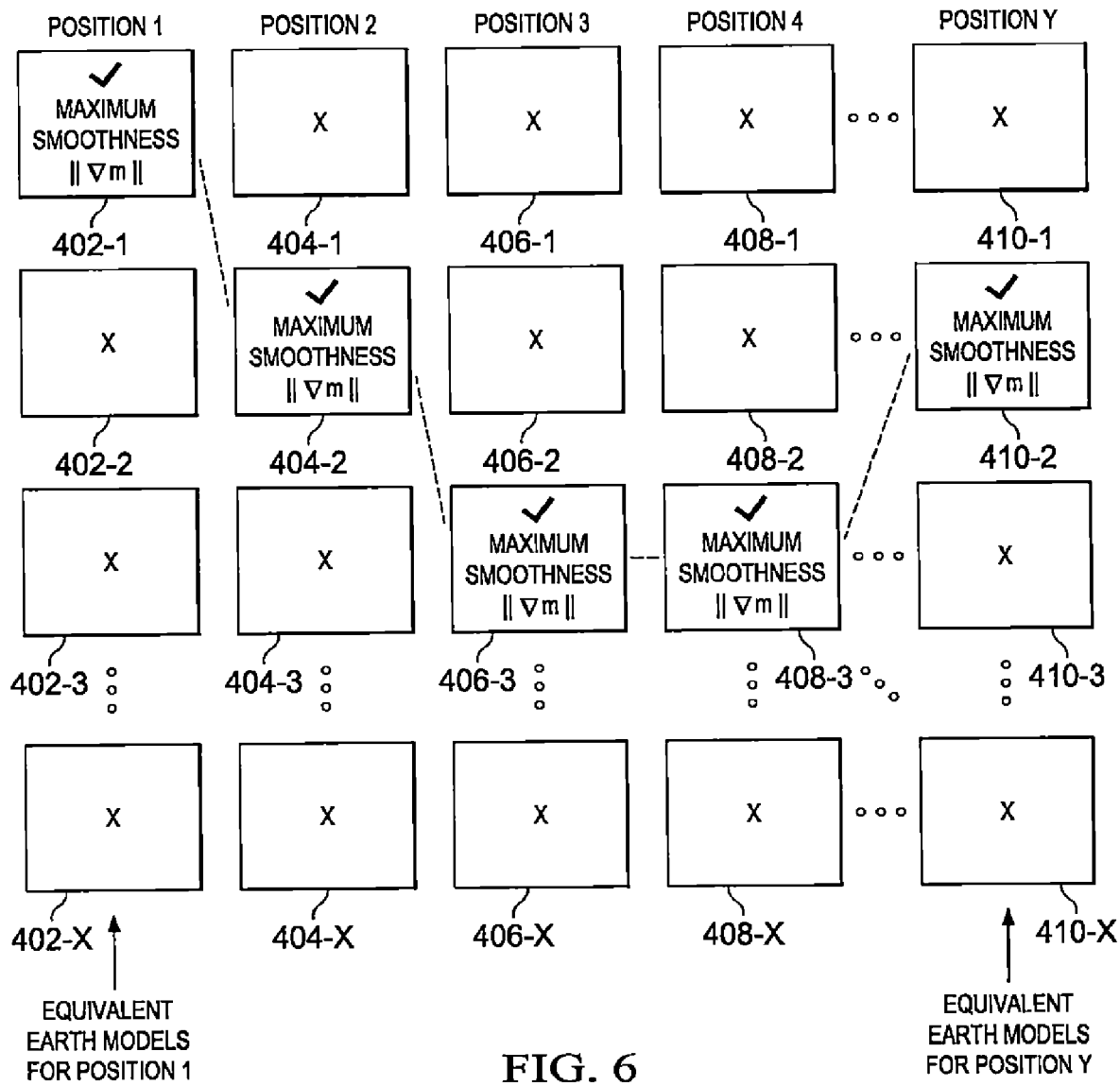
FIG. 6 shows an illustrative scenario in which the selection of FIG. 5 is performed at multiple locations.

FIG. 6 illustrates a scenario in which the selections of FIG. 5 are performed for multiple locations. For example, as described earlier with reference to FIG. 4, one of the models generated for location 2 (e.g., models 404-1, 404-2, 404-3, . . . , 404-X) is selected as an optimal model.

For each of the locations, the model that meets a particular constraint (e.g., the constraint of block 522) is selected as the optimal predicted model. As illustrated in FIG. 6, for locations 1, 2, 3, 4, . . . , Y, the models 402-1, 404-2, 406-3, 408-3, . . . , 410-2 are selected, respectively.

For example, for location 2, the model 404-2 is selected from the models 404-1, 404-2, 404-3, . . . , 404-X. The selection of the model 404-2 considers at least a spatial continuity of the model with respect to models generated for at least one other location. For example, in selecting the model 404-2, the models generated for adjacent location 1 (models 402-1, 402-2, 402-3, . . . , 402-X) are considered. Alternatively, or addition, in selecting the model 404-2, the models generated for adjacent location 3 (models 406-1, 406-2, 406-3, . . . , 406-X) are considered. Alternatively, or in addition, the models generated for one or more other adjacent locations (e.g., location 4) may be considered. To account for factors relating to directionality, parameters of such models may be weighted (e.g., by the model weighting matrix $W_m$ of Expression (9)).

The nature of the above-described selection may decrease the likelihood that a resulting 2D resistivity image will contain geologically unrealistic artefacts. For example, with respect to location 2, such a likelihood may be decreased, e.g., if the selected model 404-2 bears a high degree of similarity to one or more models generated for location 1 (e.g., model 402-1). Accordingly, a degree of spatial smoothness between selected model 404-2 and model 402-1 is stronger than degrees of spatial smoothness between an unselected model (e.g., any of models 404-1, 404-3, . . . , 404-X) and any of models 406-1, 406-2, 406-3, . . . , 406-X.

As a further or additional example, with respect to location 2, such a likelihood may be decreased, e.g., if the selected model 404-2 bears a high degree of similarity to one or more models generated for location 3 (e.g., model 406-3). Accordingly, a degree of spatial smoothness between selected model 404-2 and model 406-3 is stronger than degrees of spatial smoothness between an unselected model (e.g., any of models 404-1, 404-3, . . . , 404-X) and any of models 406-1, 406-2, 406-4, . . . , 406-X. In the noted regards, the selection of model 404-2 as an optimal model for location 2 is preferable over the selection of any of models 404-1, 404-3, . . . , 404-X.

Figure 7:
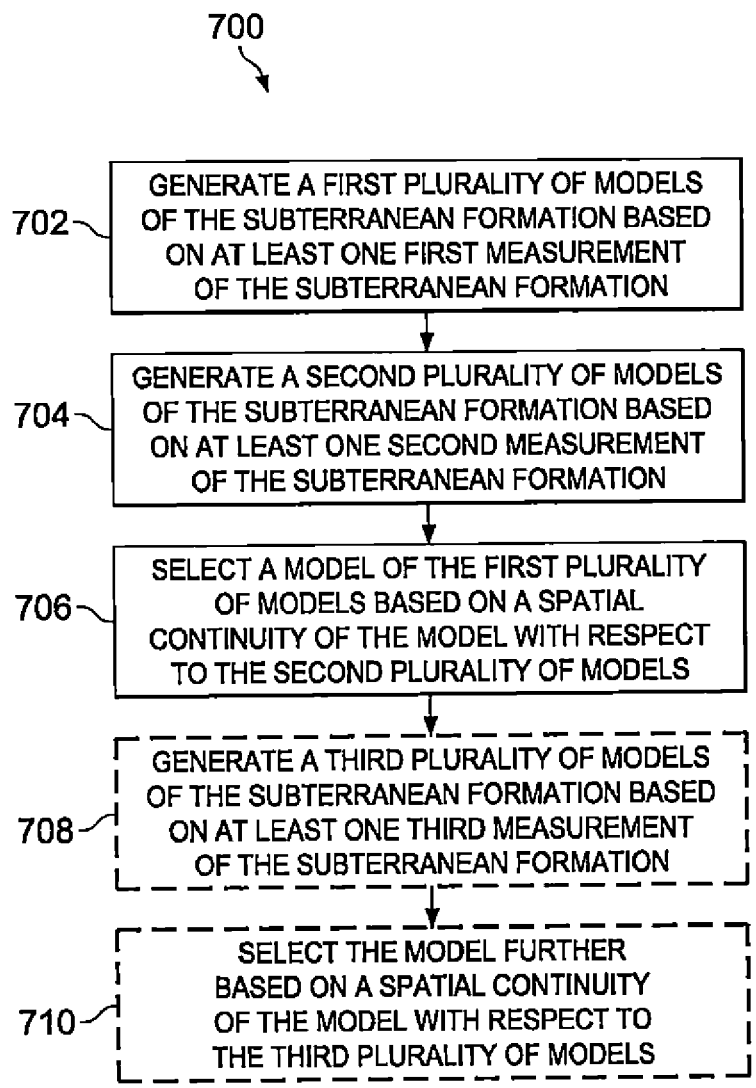
FIG. 7 is a flowchart showing an illustrative selection method employing LWD measurements.

FIG. 7 is a flowchart showing an illustrative selection method 700 employing LWD measurements. At block 702, a first plurality of models of the subterranean formation (e.g., models 314-1, . . . , 314-N) are generated based on at least one first measurement of the subterranean formation. The at least one first measurement corresponds to a first location (e.g., location 2 of FIG. 6) of a plurality of locations located along a drilling axis. At block 704, a second plurality of models of the subterranean formation (e.g., models 314-1, . . . , 314-N) are generated based on at least one second measurement of the subterranean formation. The at least one second measurement corresponds to a second location (e.g., location 1 of FIG. 6) of the plurality of locations. The second location is adjacent to the first location. At block 706, a model (e.g., a particular model) of the first plurality of models is selected based on a spatial continuity of the model with respect to the second plurality of models. For example, the selection is based on a spatial constraint described earlier with reference to the selection of block 522 of FIG. 5.

According to a further embodiment, at block 708, a third plurality of models (or at least a third plurality of models) of the subterranean formation (e.g., models 314-1, . . . , 314-N) are generated based on at least one third measurement of the subterranean formation. The at least one third measurement corresponding to a third location (e.g., location 3 of FIG. 6) of the plurality of locations. The third location is adjacent to the first location and/or the second location. At block 710, the selection of the model (from among the first plurality of models) is further based on a spatial continuity of the model with respect to the third plurality of models.

Embodiments disclosed herein include:

A: A logging system includes an electromagnetic logging tool that collects measurements of a subterranean formation as the tool is conveyed along a borehole through the subterranean formation. The logging system further includes a processing system that: generates a first plurality of models of the subterranean formation based on at least one first measurement of the subterranean formation, the at least one first measurement collected by the electromagnetic logging tool at a first location of a plurality of locations located along a drilling axis; generates a second plurality of models of the subterranean formation based on at least one second measurement of the subterranean formation, the at least one second measurement collected by the electromagnetic logging tool at a second location of the plurality of locations, wherein the second location is adjacent to the first location; and selects a model of the first plurality of models based on a spatial continuity of the model with respect to the second plurality of models.

B. A method of modeling a subterranean formation includes generating a first plurality of models of the subterranean formation based on at least one first measurement of the subterranean formation, the at least one first measurement corresponding to a first location of a plurality of locations located along a drilling axis. The method also includes generating a second plurality of models of the subterranean formation based on at least one second measurement of the subterranean formation, the at least one second measurement corresponding to a second location of the plurality of locations, wherein the second location is adjacent to the first location. The method also includes selecting a model of the first plurality of models based on a spatial continuity of the model with respect to the second plurality of models.

Each of the embodiments, A and B, may have one or more of the following additional elements in any combination. Element 1: wherein: a misfit of each model of the first plurality of models is less than a particular threshold value, the misfit based on a difference between the at least one first measurement of the subterranean formation and a predicted measurement based on the corresponding model; and the selection based on the spatial continuity improves a likelihood that the selected model is more geologically accurate than at least one other of the first plurality of models, relative to selecting based on the misfit alone. Element 2: wherein the selected threshold is based on a noise level corresponding to the at least one first measurement. Element 3: wherein a measure of the spatial continuity is determined based at least in part on a difference between a first parameter associated with the at least one first measurement, and a second parameter associated with the at least one second measurement. Element 4: wherein the second position is adjacent to the first position along the drilling axis. Element 5: wherein: the at least one first measurement comprises a first resistivity measurement; and the at least one second measurement comprises a second resistivity measurement. Element 6: wherein a measure of the spatial continuity is determined based at least in part on a difference between the first resistivity measurement and the second resistivity measurement. Element 7: wherein: the processing system generates the first plurality of models by performing a plurality of resistivity inversions based on the at least one first measurement; and the processing system generates the second plurality of models by performing a plurality of resistivity inversions based on the at least one second measurement. Element 8: wherein, among the first plurality of models, the selected model has a highest degree of spatial continuity with respect to the second plurality of models. Element 9: wherein: the processing system further generates at least a third plurality of models of the subterranean formation based on at least one third measurement of the subterranean formation, the at least one third measurement corresponding to a third location of the plurality of locations, wherein the third location is adjacent to the first location, wherein the selection of the model is further based on a spatial continuity of the model with respect to the at least a third plurality of models.

Element 10: wherein: a misfit of each model of the first plurality of models is less than a particular threshold value, the misfit based on a difference between the at least one first measurement of the subterranean formation and a predicted measurement based on the corresponding model; and the selection based on the spatial continuity improves a likelihood that the selected model is more geologically accurate than at least one other of the first plurality of models, relative to selecting based on the misfit alone. Element 11: wherein the selected threshold is based on a noise level corresponding to the at least one first measurement. Element 12: wherein a measure of the spatial continuity is determined based at least in part on a difference between a first parameter associated with the at least one first measurement, and a second parameter associated with the at least one second measurement. Element 13: wherein the second position is adjacent to the first position along the drilling axis. Element 14: wherein: the at least one first measurement comprises a first resistivity measurement; and the at least one second measurement comprises a second resistivity measurement. Element 15: wherein a measure of the spatial continuity is determined based at least in part on a difference between the first resistivity measurement and the second resistivity measurement. Element 16: wherein: generating the first plurality of models comprises performing a plurality of resistivity inversions based on the at least one first measurement; and generating the second plurality of models comprises performing a plurality of resistivity inversions based on the at least one second measurement. Element 17: wherein, among the first plurality of models, the selected model has a highest degree of spatial continuity with respect to the second plurality of models. Element 18: generating at least a third plurality of models of the subterranean formation based on at least one third measurement of the subterranean formation, the at least one third measurement corresponding to a third location of the plurality of locations, wherein the third location is adjacent to the first location, wherein the selection of the model is further based on a spatial continuity of the model with respect to the at least a third plurality of models.

Numerous variations and modifications will become apparent to those skilled in the art once the above disclosure is fully appreciated. The methods and systems can be used for drilling, logging and/or other operations where a particular formation model is to be selected from two or more formation models (e.g., equivalent formation models). The ensuing claims are intended to cover such variations where applicable.

What is claimed is:

1. A method of modeling a subterranean formation, the method comprising:
   generating a first plurality of models of the subterranean formation based on at least one first measurement of the subterranean formation, the at least one first measurement corresponding to a first location of a plurality of locations located along a drilling axis;
   generating a second plurality of models of the subterranean formation based on at least one second measurement of the subterranean formation, the at least one second measurement corresponding to a second location of the plurality of locations, wherein the second location is adjacent to the first location; and
   selecting a model of the first plurality of models based on a spatial continuity of the model with respect to the second plurality of models.

2. The method of claim 1, wherein:
   a misfit of each model of the first plurality of models is less than a particular threshold value, the misfit based on a difference between the at least one first measurement of the subterranean formation and a predicted measurement based on the corresponding model; and
   the selection based on the spatial continuity improves a likelihood that the selected model is more geologically accurate than at least one other of the first plurality of models, relative to selecting based on the misfit alone.

3. The method of claim 2, wherein the selected threshold is based on a noise level corresponding to the at least one first measurement.

4. The method of claim 1, wherein a measure of the spatial continuity is determined based at least in part on a difference between a first parameter associated with the at least one first measurement, and a second parameter associated with the at least one second measurement.

5. The method of claim 1, wherein the second position is adjacent to the first position along the drilling axis.

6. The method of claim 1, wherein:
the at least one first measurement comprises a first resistivity measurement; and
the at least one second measurement comprises a second resistivity measurement.

7. The method of claim 6, wherein a measure of the spatial continuity is determined based at least in part on a difference between the first resistivity measurement and the second resistivity measurement.

8. The method of claim 1, wherein:
generating the first plurality of models comprises performing a plurality of resistivity inversions based on the at least one first measurement; and
generating the second plurality of models comprises performing a plurality of resistivity inversions based on the at least one second measurement.

9. The method of claim 1, wherein, among the first plurality of models, the selected model has a highest degree of spatial continuity with respect to the second plurality of models.

10. The method of claim 1, further comprising:
generating at least a third plurality of models of the subterranean formation based on at least one third measurement of the subterranean formation, the at least one third measurement corresponding to a third location of the plurality of locations, wherein the third location is adjacent to the first location,
wherein the selection of the model is further based on a spatial continuity of the model with respect to the at least a third plurality of models.

11. A logging system comprising:
an electromagnetic logging tool that collects measurements of a subterranean formation as the tool is conveyed along a borehole through the subterranean formation; and
a processing system that:
generates a first plurality of models of the subterranean formation based on at least one first measurement of the subterranean formation, the at least one first measurement collected by the electromagnetic logging tool at a first location of a plurality of locations located along a drilling axis;
generates a second plurality of models of the subterranean formation based on at least one second measurement of the subterranean formation, the at least one second measurement collected by the electromagnetic logging tool at a second location of the plurality of locations, wherein the second location is adjacent to the first location; and
selects a model of the first plurality of models based on a spatial continuity of the model with respect to the second plurality of models.

12. The logging system of claim 11, wherein:
a misfit of each model of the first plurality of models is less than a particular threshold value, the misfit based on a difference between the at least one first measurement of the subterranean formation and a predicted measurement based on the corresponding model; and
the selection based on the spatial continuity improves a likelihood that the selected model is more geologically accurate than at least one other of the first plurality of models, relative to selecting based on the misfit alone.

13. The logging system of claim 12, wherein the selected threshold is based on a noise level corresponding to the at least one first measurement.

14. The logging system of claim 11, wherein a measure of the spatial continuity is determined based at least in part on a difference between a first parameter associated with the at least one first measurement, and a second parameter associated with the at least one second measurement.

15. The logging system of claim 11, wherein the second position is adjacent to the first position along the drilling axis.

16. The logging system of claim 11, wherein:
the at least one first measurement comprises a first resistivity measurement; and
the at least one second measurement comprises a second resistivity measurement.

17. The logging system of claim 16, wherein a measure of the spatial continuity is determined based at least in part on a difference between the first resistivity measurement and the second resistivity measurement.

18. The logging system of claim 11, wherein:
the processing system generates the first plurality of models by performing a plurality of resistivity inversions based on the at least one first measurement; and
the processing system generates the second plurality of models by performing a plurality of resistivity inversions based on the at least one second measurement.

19. The logging system of claim 11, wherein, among the first plurality of models, the selected model has a highest degree of spatial continuity with respect to the second plurality of models.

20. The logging system of claim 11, wherein:
the processing system further generates at least a third plurality of models of the subterranean formation based on at least one third measurement of the subterranean formation, the at least one third measurement corresponding to a third location of the plurality of locations, wherein the third location is adjacent to the first location,
wherein the selection of the model is further based on a spatial continuity of the model with respect to the at least a third plurality of models.

* * * * *

UNITED STATES PATENT AND TRADEMARK OFFICE
CERTIFICATE OF CORRECTION

PATENT NO. : 10,788,602 B2
APPLICATION NO. : 15/771685
DATED : September 29, 2020
INVENTOR(S) : Rencheng Song, Glenn A. Wilson and Burkay Donderici Page 1 of 1

It is certified that error appears in the above-identified patent and that said Letters Patent is hereby corrected as shown below:

In the Specification

In Column 9, Line 52, delete "$\|m-m_o\|_M^2+\beta\|\nabla m-\nabla_o\|_M^2+\gamma\|\nabla^2 m-\nabla^2 m_o\|_M^2 \to \min.$"
and insert -- $\|\mathbf{m} - \boldsymbol{m}_o\|_M^2 + \beta\|\nabla\mathbf{m} - \nabla \boldsymbol{m}_o\|_M^2 + \gamma\|\nabla^2\mathbf{m} - \nabla^2 \boldsymbol{m}_o\|_M^2 \to \min.$ --

In Column 9, Line 56, delete "$\|\mathbf{m} - \boldsymbol{m}_o\|_M^2, \|\nabla\mathbf{m} - \nabla_o\|_M^2 \text{ and } \|\nabla\mathbf{m} - \nabla \boldsymbol{m}_o\|_M^2.$"
and insert -- $\|\mathbf{m} - \boldsymbol{m}_o\|_M^2, \|\nabla\mathbf{m} - \nabla \boldsymbol{m}_o\|_M^2 \text{ and } \|\nabla^2\mathbf{m} - \nabla^2 \boldsymbol{m}_o\|_M^2.$ --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*